(12) United States Patent
Jones et al.

(10) Patent No.: US 12,179,148 B2
(45) Date of Patent: *Dec. 31, 2024

(54) CARBON DIOXIDE SEQUESTRATION WITH MAGNESIUM HYDROXIDE AND REGENERATION OF MAGNESIUM HYDROXIDE

(71) Applicant: CARBONFREE CHEMICALS HOLDINGS, LLC, San Antonio, TX (US)

(72) Inventors: Joe Jones, San Antonio, TX (US); Al Yablonsky, San Antonio, TX (US)

(73) Assignee: CARBONFREE CHEMICALS HOLDINGS, LLC, San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/472,194

(22) Filed: Sep. 21, 2023

(65) Prior Publication Data
US 2024/0009622 A1     Jan. 11, 2024

Related U.S. Application Data

(60) Continuation of application No. 18/054,473, filed on Nov. 10, 2022, now Pat. No. 11,772,046, which is a continuation of application No. 16/813,160, filed on Mar. 9, 2020, now Pat. No. 11,498,029, which is a division of application No. 15/552,873, filed as application No. PCT/US2016/019164 on Feb. 23, 2016, now Pat. No. 10,583,394.

(60) Provisional application No. 62/119,633, filed on Feb. 23, 2015.

(51) Int. Cl.
| | | |
|---|---|---|
| C01F 11/18 | (2006.01) | |
| B01D 53/62 | (2006.01) | |
| B01D 53/73 | (2006.01) | |
| B01D 53/78 | (2006.01) | |
| B01D 53/96 | (2006.01) | |
| C01B 7/03 | (2006.01) | |
| C01F 5/00 | (2006.01) | |
| C01F 5/14 | (2006.01) | |
| C01F 5/24 | (2006.01) | |
| C01F 5/32 | (2006.01) | |
| F23J 15/00 | (2006.01) | |

(52) U.S. Cl.
CPC ............ *B01D 53/96* (2013.01); *B01D 53/62* (2013.01); *B01D 53/73* (2013.01); *B01D 53/78* (2013.01); *C01B 7/035* (2013.01); *C01F 5/00* (2013.01); *C01F 5/14* (2013.01); *C01F 5/24* (2013.01); *C01F 5/32* (2013.01); *C01F 11/18* (2013.01); *F23J 15/006* (2013.01); *B01D 2251/402* (2013.01); *B01D 2251/604* (2013.01); *B01D 2257/504* (2013.01); *B01D 2258/0283* (2013.01); *Y02C 20/40* (2020.08); *Y02E 20/32* (2013.01); *Y02P 20/129* (2015.11); *Y02P 20/151* (2015.11)

(58) Field of Classification Search
CPC ......................................................... C01F 11/18
See application file for complete search history.

(56) References Cited

U.S. PATENT DOCUMENTS

| | | |
|---|---|---|
| 2,013,334 A | 9/1935 | Barstow et al. |
| 2,357,130 A | 8/1944 | Pike |
| 2,383,674 A | 8/1945 | Osborne |
| 2,962,350 A | 11/1960 | Trubey |
| 3,801,698 A | 4/1974 | Lowrance et al. |
| 3,855,398 A | 12/1974 | Hoffman et al. |
| 4,032,616 A | 6/1977 | Artur et al. |
| 4,069,117 A | 1/1978 | Cooper |
| 4,128,701 A | 12/1978 | Maricle |
| 4,147,599 A | 4/1979 | O'Leary et al. |
| 4,620,969 A | 11/1986 | Wilkinson |

(Continued)

FOREIGN PATENT DOCUMENTS

| | | |
|---|---|---|
| CN | 102245279 | 11/2011 |
| DE | 19631794 | 8/1997 |

(Continued)

OTHER PUBLICATIONS

"Skyonic Corporation presents The SkyMine Process—A proprietary technology that removes carbon dioxide ($CO_2$) and other flue gas pollutants—converting same into non-toxic, commercial chemicals," Presentation given to President's Council of Advisors on Science and Technology by Joe Jones and Steve Goldstein, on Sep. 20, 2005.

Air and Gas Duct Structural Design Committee of the Energy Division of the Air and Gas Structural Design Committee. *The Structural Design of Air and Gas Ducts for Power Stations and Industrial Boiler Applications*. Ronald L. Schneider, chmn. New York, NY: ASCE Publications, Aug. 1, 1995. pp. 11-15.

(Continued)

*Primary Examiner* — Stuart L Hendrickson
(74) *Attorney, Agent, or Firm* — Norton Rose Fulbright US LLP

(57) ABSTRACT

Embodiments of the present disclosure are directed to systems and methods of removing carbon dioxide from a gaseous stream using magnesium hydroxide and then regenerating the magnesium hydroxide. In some embodiments, the systems and methods can further comprise using the waste heat from one or more gas streams to provide some or all of the heat needed to drive the reactions. In some embodiments, magnesium chloride is primarily in the form of magnesium chloride dihydrate and is fed to a decomposition reactor to generate magnesium hydroxychloride, which is in turn fed to a second decomposition reactor to generate magnesium hydroxide.

12 Claims, 3 Drawing Sheets

(56) References Cited

U.S. PATENT DOCUMENTS

| | | | |
|---|---|---|---|
| 4,720,375 A | 1/1988 | Ainscow et al. |
| 4,749,453 A | 6/1988 | Harris |
| 4,764,286 A | 8/1988 | Bon et al. |
| 5,080,799 A | 1/1992 | Yan |
| 5,888,256 A | 3/1999 | Morrison |
| 6,238,628 B1 | 5/2001 | Matsutani |
| 6,340,736 B1 | 1/2002 | Coenen et al. |
| 6,488,740 B1 | 12/2002 | Patel et al. |
| 6,592,829 B2 | 7/2003 | Chakravarti et al. |
| 6,676,824 B2 | 1/2004 | Urquhart et al. |
| 6,846,584 B2 | 1/2005 | Dutil et al. |
| 6,890,497 B2 | 5/2005 | Rau et al. |
| 6,908,570 B2 | 6/2005 | Green |
| 6,958,136 B2 | 10/2005 | Chandran et al. |
| 7,361,279 B2 | 4/2008 | Hernandez et al. |
| 7,427,449 B2 | 9/2008 | Delaney et al. |
| 7,517,435 B2 | 4/2009 | Guth et al. |
| 7,527,770 B2 | 5/2009 | Monzyk et al. |
| 7,655,069 B2 | 2/2010 | Wright et al. |
| 7,655,193 B1 | 2/2010 | Rau et al. |
| 7,699,909 B2 | 4/2010 | Lackner et al. |
| 7,708,806 B2 | 5/2010 | Wright et al. |
| 7,727,374 B2 | 6/2010 | Jones |
| 7,735,274 B2 | 6/2010 | Constantz et al. |
| 7,744,761 B2 | 6/2010 | Constantz et al. |
| 7,749,476 B2 | 7/2010 | Constantz et al. |
| 7,754,169 B2 | 7/2010 | Constantz et al. |
| 7,833,328 B2 | 11/2010 | Lackner et al. |
| 7,846,406 B2 | 12/2010 | Furnary et al. |
| 7,875,163 B2 | 1/2011 | Gilliam et al. |
| 7,887,694 B2 | 2/2011 | Constantz et al. |
| 7,909,911 B2 | 3/2011 | Lackner et al. |
| 7,931,809 B2 | 4/2011 | Constantz et al. |
| 7,993,432 B2 | 8/2011 | Wright et al. |
| 7,993,500 B2 | 8/2011 | Gilliam et al. |
| 8,062,418 B2 | 11/2011 | Constantz et al. |
| 8,105,558 B2 | 1/2012 | Comrie |
| 8,114,214 B2 | 2/2012 | Constantz et al. |
| 8,114,374 B2 | 2/2012 | Blencoe et al. |
| 8,137,444 B2 | 3/2012 | Farsad et al. |
| 8,137,455 B1 | 3/2012 | Constantz et al. |
| 8,177,909 B2 | 5/2012 | Constantz et al. |
| 8,202,659 B2 | 6/2012 | Coustry et al. |
| 8,470,276 B1 | 6/2013 | Siriwardane et al. |
| 8,673,256 B2 | 3/2014 | Blencoe et al. |
| 8,741,244 B2 | 6/2014 | Jones |
| 9,968,883 B2 | 5/2018 | Yablonsky et al. |
| 10,583,394 B2 * | 3/2020 | Jones ............... B01D 53/73 |
| 11,772,046 B2 * | 10/2023 | Jones ............... C01F 5/24 |
| | | | 423/155 |
| 2002/0129450 A1 | 9/2002 | Kim |
| 2004/0051080 A1 | 3/2004 | Ernst et al. |
| 2004/0089841 A1 | 5/2004 | Green |
| 2004/0096384 A1 | 5/2004 | Echigo et al. |
| 2004/0178149 A1 | 9/2004 | Hernandez et al. |
| 2004/0213705 A1 | 10/2004 | Blencoe et al. |
| 2004/0219090 A1 | 11/2004 | Dziedzic et al. |
| 2004/0265202 A1 | 12/2004 | Chandran et al. |
| 2005/0002847 A1 | 1/2005 | Maroto-Valer et al. |
| 2005/0011770 A1 | 1/2005 | Katsuyoshi et al. |
| 2005/0013750 A1 | 1/2005 | Monykz et al. |
| 2005/0031522 A1 | 2/2005 | Delaney et al. |
| 2005/0180910 A1 | 8/2005 | Park |
| 2006/0051274 A1 | 3/2006 | Wright et al. |
| 2006/0076228 A1 | 4/2006 | Guth et al. |
| 2006/0185985 A1 | 8/2006 | Jones |
| 2006/0186562 A1 | 8/2006 | Wright et al. |
| 2006/0289003 A1 | 12/2006 | Lackner et al. |
| 2007/0187247 A1 | 8/2007 | Lackner et al. |
| 2008/0031801 A1 | 2/2008 | Lackner et al. |
| 2008/0087165 A1 | 4/2008 | Wright et al. |
| 2008/0138265 A1 | 6/2008 | Lackner et al. |
| 2008/0245660 A1 | 10/2008 | Little et al. |
| 2008/0245672 A1 | 10/2008 | Little et al. |
| 2008/0248350 A1 | 10/2008 | Little et al. |
| 2009/0001020 A1 | 1/2009 | Constantz et al. |
| 2009/0010827 A1 | 1/2009 | Geerlings et al. |
| 2009/0020044 A1 | 1/2009 | Constantz et al. |
| 2009/0074656 A1 | 3/2009 | Billings |
| 2009/0081096 A1 | 3/2009 | Pellegrin |
| 2009/0101008 A1 | 4/2009 | Lackner et al. |
| 2009/0101050 A1 | 4/2009 | Lackner et al. |
| 2009/0120288 A1 | 5/2009 | Lackner et al. |
| 2009/0127127 A1 | 5/2009 | Jones |
| 2009/0169452 A1 | 7/2009 | Constantz et al. |
| 2009/0202413 A1 | 8/2009 | Saxena |
| 2009/0232861 A1 | 9/2009 | Wright et al. |
| 2009/0294366 A1 | 12/2009 | Wright et al. |
| 2009/0320688 A1 | 12/2009 | Lackner et al. |
| 2010/0051859 A1 | 3/2010 | House et al. |
| 2010/0092368 A1 | 4/2010 | Neumann et al. |
| 2010/0095842 A1 | 4/2010 | Lackner et al. |
| 2010/0105126 A1 | 4/2010 | Wright et al. |
| 2010/0116137 A1 | 5/2010 | Wright et al. |
| 2010/0155258 A1 | 6/2010 | Kirk et al. |
| 2010/0202937 A1 | 8/2010 | Lackner et al. |
| 2011/0027142 A1 | 2/2011 | Wright et al. |
| 2011/0027143 A1 | 2/2011 | Wright et al. |
| 2011/0027157 A1 | 2/2011 | Wright et al. |
| 2011/0033357 A1 | 2/2011 | Wright et al. |
| 2011/0033358 A1 | 2/2011 | Wright et al. |
| 2011/0056382 A1 | 3/2011 | Lackner et al. |
| 2011/0079144 A1 | 4/2011 | Wright et al. |
| 2011/0079146 A1 | 4/2011 | Wright et al. |
| 2011/0079147 A1 | 4/2011 | Wright et al. |
| 2011/0079149 A1 | 4/2011 | Wright et al. |
| 2011/0079150 A1 | 4/2011 | Wright et al. |
| 2011/0081709 A1 | 4/2011 | Wright et al. |
| 2011/0081710 A1 | 4/2011 | Wright et al. |
| 2011/0081712 A1 | 4/2011 | Wright et al. |
| 2011/0083554 A1 | 4/2011 | Wright et al. |
| 2011/0091955 A1 | 4/2011 | Constantz et al. |
| 2011/0135551 A1 | 6/2011 | House et al. |
| 2012/0291675 A1 | 11/2012 | Camire et al. |
| 2013/0202516 A1 | 8/2013 | Jones et al. |
| 2014/0147371 A1 | 5/2014 | Blencoe et al. |
| 2014/0328743 A1 | 11/2014 | Jones |

FOREIGN PATENT DOCUMENTS

| | | |
|---|---|---|
| EP | 2070578 | 6/2009 |
| GB | 2460910 | 6/2010 |
| GE | 1999-1612 | 4/1999 |
| GE | 2001-2514 | 8/2001 |
| GE | 2004-3357 | 10/2004 |
| JP | 49-023797 | 3/1974 |
| JP | 51-023499 | 2/1976 |
| JP | 52-085997 | 7/1977 |
| JP | 55-056015 | 4/1980 |
| JP | 61-048587 | 3/1986 |
| JP | 10-001307 | 1/1998 |
| JP | 2002-273163 | 9/2002 |
| JP | 2004-174369 | 6/2004 |
| JP | 2006-137620 | 6/2006 |
| JP | 2010-125354 | 6/2010 |
| JP | 2011-521879 | 7/2011 |
| JP | 2012-504043 | 2/2012 |
| RU | 2 019 271 | 9/1994 |
| RU | 2 031 695 | 3/1995 |
| RU | 2 054 959 | 2/1996 |
| RU | 2 199 374 | 2/2003 |
| RU | 2 334 547 | 8/2005 |
| WO | WO 98/24725 | 6/1998 |
| WO | WO 2004/037391 | 5/2004 |
| WO | WO 2004/098740 | 11/2004 |
| WO | WO 2005/108291 | 11/2005 |
| WO | WO 2005/108297 | 11/2005 |
| WO | WO 2006/009600 | 1/2006 |
| WO | WO 2006/023743 | 3/2006 |
| WO | WO 2006/034339 | 3/2006 |
| WO | WO 2006/036396 | 4/2006 |
| WO | WO 2006/084008 | 8/2006 |
| WO | WO 2006/113673 | 10/2006 |
| WO | WO 2006/113997 | 11/2006 |

(56) References Cited

FOREIGN PATENT DOCUMENTS

| | | |
|---|---|---|
| WO | WO 2007/003013 | 1/2007 |
| WO | WO 2007/016271 | 2/2007 |
| WO | WO 2007/018558 | 2/2007 |
| WO | WO 2007/078017 | 7/2007 |
| WO | WO 2008/018928 | 2/2008 |
| WO | WO 2008/042919 | 4/2008 |
| WO | WO 2008/061210 | 5/2008 |
| WO | WO 2008/124538 | 10/2008 |
| WO | WO 2008/131132 | 10/2008 |
| WO | WO 2008/148055 | 12/2008 |
| WO | WO 2009/039445 | 3/2009 |
| WO | WO 2009/061836 | 5/2009 |
| WO | WO 2009/086460 | 7/2009 |
| WO | WO 2009/102816 | 8/2009 |
| WO | WO 2009/105566 | 8/2009 |
| WO | WO 2009/149292 | 12/2009 |
| WO | WO 2010/019600 | 2/2010 |
| WO | WO 2010/022399 | 2/2010 |
| WO | WO 2010/132395 | 11/2010 |
| WO | WO 2011/011740 | 1/2011 |
| WO | WO 2011/075680 | 6/2011 |
| WO | WO 2012/006601 | 1/2012 |
| WO | WO 2012/028535 | 9/2012 |
| WO | WO 2013/106730 | 7/2013 |
| WO | WO 2015/109190 | 7/2015 |
| WO | WO 2016/064918 | 4/2016 |

OTHER PUBLICATIONS

Baris, et al., "The Assessment for $CO_2$ Sequestration Potential by Magnesium Silicate Minerals in Turkey,; Cases of Orhaneli-Bursa and Divrigi-Sivas Regions," Energy Exploration & Exploitation, 26(5); 293-309, 2008.
Cadmium Chloride, Material Safety Data Sheet, CAS No. 7790-78-5, ESPI Metals, available on the internet at http://www.espimetals.com/index.php/msds/460-cadmium-chloride. Revised/Verified Sep. 2005. Accessed Dec. 28, 2011.
Calcium Nitrate Tetrahydrate, Material Safety Data Sheet, CAS No. 13477-34-4, available on the internet at http://avogadro.chem.iastate.edu/MSDS/Ca%28NO3%292-4H2O.htm. MSDS Creation Date: Jan. 21, 1998. Revision #4 Date: Oct. 3, 2005. Accessed Dec. 28, 2011.
Cobalt Iodide, Material Safety Data Sheet, CAS No. 45238-00-3, ESPI Metals, available on the internet at http://www.espimetals.com/index.php/msds/527-cobalt-iodide. Revised/Verified Dec. 2004. Accessed Dec. 28, 2011.
Cobalt(II) Sulfate Heptahydrate, Material Safety Data Sheet, CAS No. 10026-24-1, Chemical Book, available on the internet at http://www.chemicalbook.com/ProductMSDSDetailCB0323842_EN.htm. Copyright 2008. Accessed Dec. 28, 2011.
European Search Report Issued in Corresponding European Application No. 16756203.2, dated Nov. 9, 2018.
Extended European Search Report issued in corresponding European Application No. 23182535.7, dated Nov. 2, 2023.
Goldberg et al., "CO2 mineral sequestration studies in US," Proceedings of First National Conference on Carbon Sequestration, May 14-17, 2001, Washington, DC., section 6c, United States Department of Energy, National Energy Technology Laboratory. available at: http://www.netl.doe.gov/publications/proceedings/01/carbon_seq/6c1.pdf.
Haywood, et al. "Carbon Dioxide Sequestration as Stable Carbonate Minerals—Environmental Barriers." Environmental Geology 41:11-16 (2001).
Hearing Notice in corresponding India Application No. 201717033007, dated Nov. 25, 2022.
Huijgen & Comans, "Carbon dioxide sequestration by mineral carbonation" Literature Review, 2003.
International Search Report and Written Opinion issued in Application No. PCT/US2016/019164. mailed May 6, 2016.
Kelley, "Energy requirements and equilibria in the dehydration, hydrolysis, and decomposition of magnesium chloride", Technical Paper 676, United States Government Printing Office, pp. 1-26, 1945.

Kirk-Othmer Encyclopedia of Chemical Technology, $4^{th}$ ed. vol. 15 p. 343, 1998, New York: John Wiley and Sons.
Kirsh et al., "Kinetic analysis of thermal dehydration and hydrolysis of MgCl12.6H2O by DTA and TG," Journal of Thermal Analysis, 32:393-408, 1987.
Kondakov, D. F. et al., "Manufacturing of Magnesium Hydroxide from Natural Magnesium Chloride Sources", Theoretical Foundations of Chemical Engineering, 41(5): 572-576, 2007.
Lackner et al., "Magnesite disposal of carbon dioxide," submitted to $22^{nd}$ International Technical Conference on Coal Utilization and Fuel System, Clearwater, Florida, Mar. 16-19, 1997.
Lackner, et al., "Carbon Dioxide Disposal in Carbonate Minerals," Energy vol. 20, No. 11, pp. 1153-1170 (1995).
Lithium Bromide, Material Safety Data Sheet, CAS No. 7550-35-8, ChemCas, available on the internet at http://www.chemcas.com/material/cas/archive/7550-35-8_v1.asp. Material Safety Data Sheet Creation Date: Jun. 29, 1999. Revision #3 Date: Mar. 18, 2003. Accessed Dec. 28, 2011.
Magnesium Nitrate Hexahydrate, Material Safety Data Sheet, CAS No. 13446-18-9, available on the internet at http://avogadro.chem.iastate.edu/MSDS/MgNO3-6H2O.htm. Material Safety Data Sheet Creation Date: Sep. 2, 1997. Revision #6 Date: Aug. 11, 2004. Accessed Dec. 28, 2011.
Manganese (II) Chloride Tetrahydrate, Material Safety Data Sheet, CAS No. 13446-34-9, available on the internet at http://avogadro.chem.iastate.edu/MSDS/MnCl2.htm. Material Safety Data Sheet Creation Date: Dec. 12, 1997. Revision #2 Date: Mar. 18, 2003. Accessed Dec. 28, 2011.
Ohta, Tokio. Solar-Hydrogen Energy Systems, Pergamon Press, 1979, p. 104.
PCT International Preliminary Report on Patentability issued in International Application No. PCT/US2008/077122, dated Apr. 1, 2010.
PCT International Search Report and Written Opinion issued in International Application No. PCT/US2005/033814, dated Feb. 15, 2006.
PCT International Search Report and Written Opinion issued in International Application No. PCT/US2010/061111, dated Feb. 18, 2011.
PCT International Search Report and Written Opinion issued in International Application No. PCT/US11/43470, dated Dec. 6, 2011.
PCT International Search Report and Written Opinion issued in International Application No. PCT/US2008/077122, dated Oct. 30, 2009.
Proceedings of First National Conference on Carbon Sequestration, May 14-17, 2001, Washington, DC. United States Department of Energy, National Energy Technology Laboratory. CD-ROM USDOE/NETL-2001/1144; also available at http://www.netl.doe.gov/publications/proceedings/01/carbon_seq/carbon_seq01.html.
Pulvirenti et al., "Acid generation upon thermal concentration of natural water: The critical ate content and the effects of ionic composition," Journal of Contaminant Hydrology, 109:62-81, 2009.
Search Report, issued by Georgian National Center of Intellectual Property "SAK:ATENT", issued in Georgian Application No. AP 2005 009999, dated Jan. 8, 2010. (English Translation).
Shore et al., "V.F.1—Platinum Group Metal Recycling Technology Development," Department of Energy Hydrogen Program, United States. Department of Energy Fiscal Year 2008 Annual Progress Report, pp. 35-938. Published Nov. 2008. Available on the internet at http://www.hydrogen.energy.gov/pdfs/progress08/v_f_1_shore.pdf. Accessed Dec. 28, 2011.
Sodium Iodide, Material Safety Data Sheet, CAS No. 7681-82-5, Chemical Book, available on the internet at http://www.chemicalbook.com/ProductMSDSDetailCB6170714_EN.htm. Copyright 2008. Accessed Dec. 28, 2011.
Solar-Hydrogen Energy System: Chapter 5—Thermochemical Hydrogen Production, Published by Pergamon, Dec. 31, 1979, pp. 81-114.
U.S. Appl. No. 60/612,355 entitled "Removing Carbon Dioxide From Waste Streams Through Co-Generation Of Synthetic Carbonate Minerals," by Joe David Jones, filed Sep. 23, 2004.
U.S. Appl. No. 60/642,698 entitled "Removing Carbon Dioxide From Waste Streams Through Co-Generation Of Synthetic Carbonate Minerals," by Joe David Jones, filed Jan. 10, 2005.

(56) References Cited

OTHER PUBLICATIONS

U.S. Appl. No. 60/718,906 entitled "Removing Carbon Dioxide From Waste Streams Through Co-Generation Of Synthetic Carbonate Minerals ," by Joe David Jones, filed Sep. 20, 2005.
U.S. Appl. No. 60/973,948 entitled "Removing Carbon Dioxide From Waste Streams Through Co-Generation Of Carbonate And/Or Bicarbonate Minerals," by Joe David Jones, filed Sep. 20, 2007.
U.S. Appl. No. 61/032,802 entitled "Removing Carbon Dioxide From Waste Streams Through Co-Generation Of Carbonate And/Or Bicarbonate Minerals ," by Joe David Jones, filed Feb. 29, 2008.
U.S. Appl. No. 61/033,298 entitled "Removing Carbon Dioxide From Waste Streams Through Co-Generation Of Carbonate And/Or Bicarbonate Minerals," by Joe David Jones, filed Mar. 3, 2008.
U.S. Appl. No. 61/288,242 entitled "Carbon Dioxide Sequestration Through Formation of Group-2 Carbonates and Silicon Dioxide", by Joe David Jones, filed Dec. 18, 2009.
U.S. Appl. No. 61/362,607 entitled "Carbon Dioxide Sequestration Involving Energy-Efficient Conversion of Group 2 Chlorides to Group 2 Hydroxides," by Joe David Jones, filed Jul. 8, 2010.
U.S. Appl. No. 61/370,030 entitled "Carbon Dioxide Sequestration Involving Energy-Efficient Conversion of Group 2 Chlorides to Group 2 Hydroxides," by Joe David Jones and Al Yablonsky, filed Aug. 2, 2010.
U.S. Appl. No. 61/406,536 entitled "Carbon Dioxide Sequestration Involving Energy-Efficient Conversion of Group 2 Chlorides to Group 2 Hydroxides," by Joe David Jones and Al Yablonsky, filed Oct. 25, 2010.
U.S. Appl. No. 61/451,078 entitled "Carbon Dioxide. Sequestration Involving Energy-Efficient Conversion of Group 2 Chlorides to Group 2 Hydroxides," by Joe David Jones and Al Yablonsky, filed Mar. 9, 2011.
Wei, Xinchao, "Technological evaluation of mineral sequestration of $CO_2$ by carbonation," Thesis submitted to College of Engineering and Mineral Resources at West Virginia University in partial fulfillment of the requirements for the degree of Master of Science in Mining Engineering, 2003.
Zhang, et al."A Novel Indirect Wollastonite Carbonation Route for CO2 Sequestration" *Chemical Engineering Technology* vol. 33, No. 7, 1177-1183.

\* cited by examiner

CARBON DIOXIDE SEQUESTRATION WITH MAGNESIUM HYDROXIDE AND REGENERATION OF MAGNESIUM HYDROXIDE

CROSS REFERENCE TO RELATED APPLICATIONS

This application is a continuation application of U.S. Ser. No. 18/054,473 (now U.S. Pat. No. 11,772,046), filed Nov. 10, 2022, which is a continuation of U.S. Ser. No. 16/813,160 (now U.S. Pat. No. 11,498,029), filed Mar. 9, 2020, which is a divisional of U.S. Ser. No. 15/552,873 (now U.S. Pat. No. 10,583,394), filed Aug. 23, 2017, which is a national phase under 35 U.S.C. § 371 of International Application No. PCT/US2016/019164, filed Feb. 23, 2016, which claims the benefit of priority to U.S. Provisional Patent Application Ser. No. 62/119,633, filed Feb. 23, 2015, the entire contents of each of which are hereby incorporated by reference in their entirety.

A. FIELD OF THE INVENTION

The invention generally concerns devices, systems, and methods related to systems and processes of carbon sequestration with magnesium hydroxide and for regeneration of magnesium hydroxide from magnesium halide.

B. BACKGROUND

Considerable domestic and international concern has been increasingly focused on the emission of $CO_2$ into the air. In particular, attention has been focused on the effect of this gas on the retention of solar heat in the atmosphere, producing the "greenhouse effect." Although there is some debate regarding the magnitude of the effect, all would agree there is a benefit to removing $CO_2$ (and other chemicals) from point-emission sources, especially if the cost for doing so were sufficiently small.

Despite years of development, the task of creating a commercially-viable, environmentally-sensitive process for removing carbon dioxide from an emission source has proven to be a difficult. The methodologies to date have not been altogether satisfactory in this regard, and a significant need exists for the techniques described and claimed in this disclosure.

SUMMARY

One aspect of the present disclosure is a system configured to regenerate $Mg(OH)_2$ and reduce the amount of $CO_2$ contained in a gas stream through consumption of the $Mg(OH)_2$. In some embodiments, the system can comprise: a first decomposition reactor configured to react $MgCl_2$ containing material with steam to form first reactor products comprising $Mg(OH)Cl$ and HCl; a second decomposition reactor configured to react $Mg(OH)Cl$ from the first decomposition reactor with steam to form HCl and magnesium-containing products comprising mostly $Mg(OH)_2$; and a first absorption reactor configured to form an admixture comprising $Mg(OH)_2$ from the second decomposition reactor, $CO_2$, $CaCl_2$, and steam to form products comprising $MgCl_2$ and $CaCO_3$. The $MgCl_2$ containing material fed to the first decomposition reactor can comprise a molar ratio of water to $MgCl_2$ of less than about 2.5:1. In some embodiments, the system can further comprise a gaseous feed line configured to pass a gaseous outflow from the second decomposition reactor to the first decomposition reactor, where the gaseous outflow comprises HCl and steam. In some embodiments, the system can further comprise a second absorption reactor, wherein the first absorption reactor is configured to admix $Mg(OH)_2$ from the second decomposition reactor with $CO_2$ contained in the gas stream and form $MgCO_3$ and $H_2O$ and wherein the second absorption reactor is configured to admix the $MgCO_3$ from the first absorption reactor with $CaCl_2$ and form $CaCO_3$ and $MgCl_2$. In some embodiments, the first absorption reactor products are in a liquid phase and a solid phase, and the liquid phase is at least 50% by weight of $MgCl_2$. In some embodiments, the first absorption reactor (or the second absorption reactor if present) contains a liquid phase comprising a ratio of water to $MgCl_2$ of less than about 4.5:1 or about 4 to 1. In some embodiments, a major portion of $MgCl_2$ in the liquid phase that exits an absorption reactor is in the form of $MgCl_2$ tetrahydrate. In some embodiments, the system further comprises a solid liquid separator configured to separate at least a portion of the $CaCO_3$ from the liquid phase. In some embodiments, the system a dryer configured to remove a portion of the water from the liquid phase so the ratio of water to $MgCl_2$ is about 2 to 1. In some embodiments, a waste heat recovery and heat transfer system is utilized to provide the necessary heat to maintain reaction conditions for each system module.

Another aspect of the disclosure is a method of regenerating $Mg(OH)_2$ in a process that reduces the amount of $CO_2$ contained in a gas stream. In some embodiments, the method can comprise the following steps: (a) reacting $MgCl_2$-containing material with steam in a first admixture to form step (a) products comprising $Mg(OH)Cl$ and HCl, where the $MgCl_2$ containing material comprises a water to $MgCl_2$ ratio of less than about 2.5:1; (b) reacting $Mg(OH)Cl$ from step (a) with steam in a second admixture to form step (b) products comprising HCl and magnesium-containing products comprising mostly $Mg(OH)_2$; and (c) reacting $Mg(OH)_2$ from step (b) with $CO_2$, $CaCl_2$, and steam to form step (c) products comprising $MgCl_2$ and $CaCO_3$. In some embodiments, the method further comprises passing a gaseous outflow from the second admixture to the first admixture, where the gaseous outflow comprises HCl and steam to react with the $MgCl_2$ containing material. In some embodiments, step (c) can comprise a two stage process of admixing $Mg(OH)_2$ from step (b) with $CO_2$ contained in the gas stream in a third admixture to form first step (c) products comprising $MgCO_3$ and $H_2O$ and admixing the $MgCO_3$ from first step (c) products with $CaCl_2$ in a fourth admixture to form a second step (c) products comprising $CaCO_3$ and $MgCl_2$. In some embodiments, the liquid phase of the first admixture is at least 50% by weight of $MgCl_2$. The method can further comprise the step or steps of separating at least a portion of the $CaCO_3$ and a portion of the water from the second step (c) products so that, in a remaining product, the ratio of water to $MgCl_2$ is about 2 to 1. In some embodiments, the first step (a) product comprises greater than 90% by weight of $Mg(OH)Cl$. In some embodiments, the first step (b) product comprises greater than 90% by weight of $Mg(OH)_2$. In some embodiments, the method can comprise recovering waste heat from a gas stream and transferring to the first admixture, the second admixture, and/or the remaining product comprising $MgCl_2$ dihydrate. In recovering and transferring the waste heat, three or more heating loops can be used.

Another aspect of the present disclosure is a method for producing magnesium hydroxide from magnesium chloride-containing material comprising: a first stage comprising the steps of introducing said material into a first reactor, passing a steam mixture into the first reactor with the magnesium chloride-containing material at the approximate temperature of 250 to 400 C, to form magnesium hydroxychloride and HCl, a second stage of conveying the magnesium hydroxychloride into a second reactor, introducing therewith steam to form magnesium hydroxide and HCl, where the magnesium chloride-containing material comprises a water to magnesium chloride ratio of about 2:1. In some embodiments, a portion of a steam mixture exiting the second reactor is the steam mixture introduced into the first reactor. At least a portion of the HCl exits the second reactor in the steam mixture that then passes through the first reactor. In some embodiments, the magnesium chloride-containing material substantially comprises magnesium chloride dihydrate. In some embodiments, waste heat is utilized to provide the heat necessary to form the $Mg(OH)_2$.

The terms "a" and "an" are defined as one or more unless this disclosure explicitly requires otherwise.

The terms "substantially," "approximately" and "about" are defined as being largely but not necessarily wholly what is specified (and include wholly what is specified) as understood by one of ordinary skill in the art. In any disclosed embodiment, the term "substantially," "approximately," or "about" may be substituted with "within [a percentage] of" what is specified, where the percentage includes 0.1, 1, 5, and 10 percent.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, any of the present devices, systems, and methods that "comprises," "has," "includes" or "contains" one or more elements possesses those one or more elements, but is not limited to possessing only those one or more elements. Likewise, an element of a device, system, or method that "comprises," "has," "includes" or "contains" one or more features possesses those one or more features, but is not limited to possessing only those one or more features. Additionally, terms such as "first" and "second" are used only to differentiate structures or features, and not to limit the different structures or features to a particular order.

Furthermore, a structure that is capable performing a function or that is configured in a certain way is capable of configured in at least that way, but may also be capable or configured in ways that are not listed.

The feature or features of one embodiment may be applied to other embodiments, even though not described or illustrated, unless expressly prohibited by this disclosure or the nature of the embodiments.

Any of the present devices, systems, and methods can consist of or consist essentially of—rather than comprise/include/contain/have—any of the described elements and/or features and/or steps. Thus, in any of the claims, the term "consisting of" or "consisting essentially of" can be substituted for any of the open-ended linking verbs recited above, in order to change the scope of a given claim from what it would otherwise be using the open-ended linking verb.

Details associated with the embodiments described above and others are presented below.

BRIEF DESCRIPTION OF THE DRAWINGS

The following drawings illustrate by way of example and not limitation. For the sake of brevity and clarity, every feature of a given structure may not be labeled in every figure in which that structure appears. Identical reference numbers do not necessarily indicate an identical structure. Rather, the same reference number may be used to indicate a similar feature or a feature with similar functionality, as may non-identical reference numbers.

DETAILED DESCRIPTION

Figure 1:
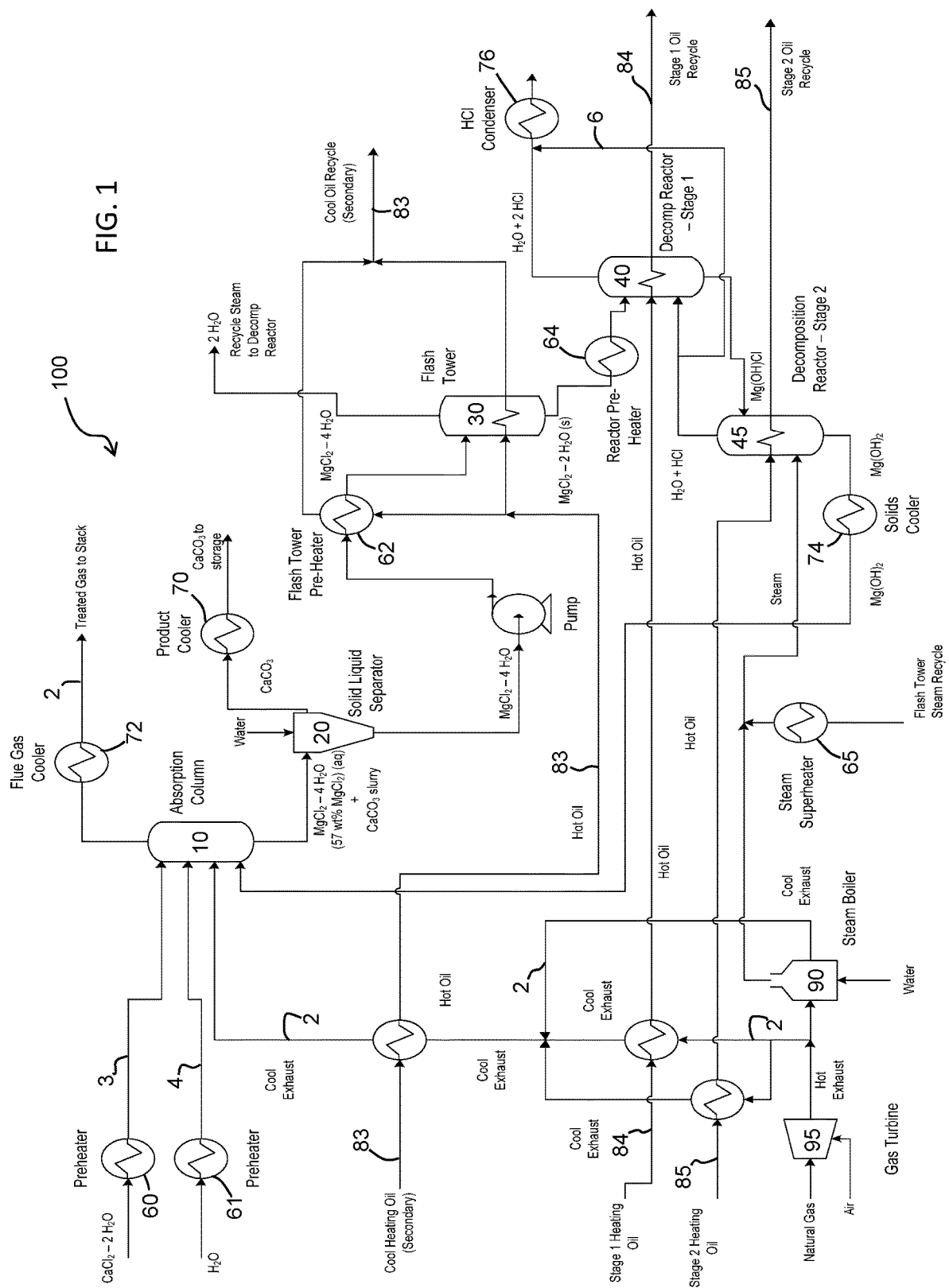
FIG. 1 is a simplified process flow diagram according to some embodiments of the processes provided herein.

Referring to FIG. 1, shown therein and designated by the reference numeral 100 is a first embodiment of a system configured to remove from a gaseous stream using $Mg(OH)_2$ and to regenerate the $Mg(OH)_2$. System 100 is configured to absorb carbon dioxide from a gas stream 2 and regenerate at least one of the reactants, e.g., magnesium hydroxide, used in the absorption process. System 100 comprises an absorption reactor 10 configured to absorb $CO_2$ from a gaseous stream; a solid-liquid separator 20 configured to separate carbonate solids from aqueous magnesium chloride; a dryer 30 configured to remove a portion of water from the aqueous magnesium chloride forming magnesium chloride solids; a first decomposition reactor 40 configured to convert the magnesium chloride to magnesium hydroxychloride, and a second decomposition reactor 45 configured to convert the magnesium hydroxychloride to magnesium hydroxide. Also illustrated in system 100 is a plurality of heaters and heating fluid systems to elevate the temperatures of the different reactants.

Prior to treating the carbon dioxide containing gas stream 2, the temperature of gas stream 2 may be lowered. In the instance of a hot gas stream, (e.g., gas turbine exhaust), gas stream 2 can provide process heat that is transferred to different units in the system. In some embodiments, the process heat can be transferred to one or more of boilers, pre-heaters, reactors, or dryers 30 in the system. For example, in the embodiment shown, process heat can be transferred to a recycling heating fluid such as a hot oil system configured to provide indirect heating to the decomposition reactor. In some embodiments, process heat can be used to heat a boiler configured to generate superheated steam for direct steam injection into the decomposition reactor. In some embodiments, a second recycling heating fluid, such as a second hot oil system, is configured to provide indirect heating to dryer 30 to remove water from the $MgCl_2$ containing starting material.

After heat has been removed from gas stream 2, gas stream 2 enters absorption reactor 10 configured to react the $CO_2$ with $CaCl_2$ and $Mg(OH)_2$ via the following overall reactions:

$$CaCl_2 + Mg(OH)_2 + CO_2 \rightarrow CaCO_3 + MgCl_2 + H_2O \qquad (1)$$

Reactor 10 can be configured to receive $CaCl_2$ feed 3, gas stream 2, and a $Mg(OH)_2$ feed. In some embodiments, absorption reactor 10 is configured to operate at temperatures greater than 165° C., such as between about 170 to 250° C. In some embodiments, the operation temperature of reactor 10 can be at least 170, 175, 180, 185, 190, 195, 200, 210, 220, 230, or 240° C. In some embodiments, the operation temperature of reactor 10 is between 175 and 185° C. To maintain a temperature above the operation temperature, reactor 10 can be configured similar to a distillation column, with a water reflux entering the top of the column and a heat input at the bottom of the column to maintain a bottom liquid product at the operation temperature, such as about 175° C.

In some embodiments, the reactants can be preheated to the operation temperature prior to introducing into absorption reactor 10. For example, a calcium chloride feed 3 is preheated in heater 60 prior to being added to absorption reactor 10. In some embodiments, a water feed 4 may also be preheated in heater 61. As the reaction of $CO_2$ with hydroxide is exothermic, heat can be removed from reactor 10 to maintain operation temperature. In some embodiments, a circulating heating fluid loop (not shown) can be configured to transfer heat from reactor 10 to $CaCl_2$ feed 5, such as through heater 60. Similarly, a separate circulating heating fluid loop (not shown) can be configured to transfer heat from reactor 10 to water feed 4, such as through heater 61. By way of example, approximately 63 MMBtu/hr of process heat (such as from reactor 10) can be needed to heat 1,679 lb*mol/hr of $CaCl_2*2H_2O$ solids from 25° C. to 175° C. and melt the solids at its melting point of 175° C., and to heat 1,679 lb*mol/hr of water from 25° C. to 100° C., vaporize the water, and superheat the steam to 175° C.

Calcium chloride can be added to reactor 10 in one of three forms to absorption reactor 10: anhydrous $CaCl_2$, $CaCl_2*2H_2O$, or $CaCl_2*4H_2O$. In some embodiments, a molar ratio of water to $CaCl_2$ of about 3:1 or less can be added to the absorption column for every mole of $CO_2$ that is captured. In some embodiments, $CaCl_2*2H_2O$ and water are fed to absorption reactor 10 to create an equivalent mixture of $CaCl_2*3H_2O$ (67.2 wt % aqueous $CaCl_2$). In some embodiments, $CaCl_2$ feed 3 in dihydrate form can be converted from a solid phase to a liquid phase prior to entering reactor 10.

Reactor 10 is configured to comprise an outlet for aqueous slurry of $CaCO_3$ solids in aqueous $MgCl_2$ and an outlet for gas stream 2 that contains a reduced amount of $CO_2$ than that inputted into reactor 10. In some embodiments, gas stream 2 with the reduced $CO_2$ concentration exits absorption reactor 10 and can then pass through gas cooler 72 where heat can be further recovered before gas stream 2 is exhausted to the atmosphere or further processed downstream. The heat can be used to pre-heat the reactants, such as $CaCl_2$ and optionally water. As a result of the absorption column, the amount of $CO_2$ in gas stream 2 can be reduced by at least 30%, 40%, 50%, 60%, 70%, 80%, 90%, 95%, 98%, or 99%.

In some embodiments, at least 50 wt % aqueous $MgCl_2$ exits absorption reactor 10 and enters solid-liquid separator 20, which separates the $CaCO_3$ solids from the aqueous solution. In some embodiments, a weight percent of aqueous $MgCl_2$ between 50 to 60% exits absorption reactor 10 and enters solid-liquid separator 20, such as 51%, 53%, 55%, 57%, or 59% wt $MgCl_2$. In some embodiments, a ratio of water to $MgCl_2$ in the aqueous solution is less than about 5 to 1, about 4.5 to 1, or about 4 to 1. In some embodiments, a major portion of $MgCl_2$ in the aqueous solution is in the form of $MgCl_2$ tetrahydrate.

In some embodiments, water may be added to solid-liquid separator 20 to facilitate the separation of the carbonate solids. In such embodiments, the amount of water to be added can dilute the solution by less than 30%, 25%, 20%, 15%, 10%, or 5%. Once separated, in some embodiments, the hot $CaCO_3$ solids can be passed through a cooler 70 for energy recovery before being sent to storage.

After separating the carbonate solids from the aqueous $MgCl_2$, the aqueous solution is transferred to dryer 30 to remove water from the solution. In some embodiments, a sufficient amount of water is evaporated from the solution so that the ratio of water to $MgCl_2$ is less than about 3:1, about 2.5:1, or less than about 2 to 1. In some embodiments, a major portion of the water in the magnesium chloride-containing material exiting dryer 30 is in the form of $MgCl_2$ dihydrate. For example, the magnesium chloride containing material comprises at least 55%, 60%, 65% 70%, 75% 80%, 85% 90%, 95%, or 98% of $MgCl_2*2H_2O$ (s). The primary reaction in dryer 30 is provided below:

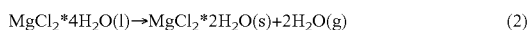

$$MgCl_2*4H_2O(l) \rightarrow MgCl_2*2H_2O(s)+2H_2O(g) \qquad (2)$$

In some embodiments, to supply the needed energy to remove a portion of the water, heat can be supplied to the vessel to keep the operation temperature at between 150 to 250° C., such as 160, 170, 180, 190, 200, 210, 220, 230, or 240° C. In some embodiments, the temperature can be kept between 195 and 205° C. or 198 and 202° C. Dryer 30 is configured such that superheated steam (and potentially some HCl) exits the top of the vessel, while magnesium chloride containing material comprising dihydrate salts moves to first decomposition reactor 40. In some embodiments, operation pressures are at atmospheric pressure. In some embodiments, the superheated steam produced from dryer 30 can supply at least a portion of the steam required for decomposition reactors 40 and/or 45.

In some embodiments, the aqueous $MgCl_2$ solution is pumped through a heater 62 before entering dryer 30 to raise the temperature of the solution to substantially equal to the operation temperatures of dryer 30. In some embodiments, heat can be transferred to the solution at heater 62 by a circulating heating fluid loop 83 configured to transfer heat from gas stream 2 to the aqueous solution.

In some embodiments, system 100 comprises an evaporator 30 that is configured to reduce the water content so that $MgCl_2$ turns to solid and the solid material can be transferred to first decomposition reactor 40. For example, evaporator 30 can comprise a flash drum having a scraper or other agitator configured to facilitate conveyance to solid material. In some embodiments, in evaporator 30, a pressurized $MgCl_2$ solution at the operation temperature is flashed to atmospheric pressure to remove water from the aqueous solution and produce $MgCl_2*2H_2O$ solids. In some embodiments, a portion of the heating fluid in circulating loop 83 may be directed to evaporator 30 to maintain the operation temperatures of evaporator 30.

In some embodiments, system 100 comprises a dryer 30 that is configured to reduce the water content so that aqueous $MgCl_2$ turns to solid and the solid material can be transferred to first decomposition reactor 40. Dryer 30 can be configured to apply indirect contact heating or direct contact heating using a medium such as air to maintain operation temperatures. For example, dryer 30 can be a rotary dryer, a flash dryer, or a spray dryer. In some embodiments, a portion of the heating fluid in circulating loop 83 may be directed to dryer 30 to maintain the operation temperatures of dryer 30 and may also be directed to blower to heat the drying medium such as air. Other embodiments, in lieu of dryer 30, system 100 can comprise a flaker, a crystallizer, or a priller configured to reduce the water content so that the molar ratio is about 2:1 and/or the $MgCl_2$ is mostly in a dihydrate form and can be transferred to first decomposition reactor 40.

By way of example, the heat input needed to raise the temperature of the aqueous solution to an operation temperature of 200° C. is approximately 7 MMBtu/hr. Further, also by way of example, the heat input needed to reduce the water content of an aqueous solution where the molar ratio of water is 4:1 is approximately 71 MMBtu/hr. For circulating heating fluid loop 83, the fluid return temperature can be about 5 to 15° C. above the operation temperature, e.g., 210° C., for the fluid leaving dryer 30 or heater 62. In addition, the fluid supply temperature (e.g., the temperature of the fluid approaching dryer 30 or heater 62) can be about 20 to 30° C. above the operation temperature or 10 to 20° C. above the return temperature, e.g., 225° C. At the intercept of loop 83 with gas stream 2, the temperature of gas stream 2 can be a temperature that is at least 30 to 40 above the operation temperature of decomposition reactor 40. In some embodiments, the temperature of gas stream 2 after transferring heat to loop 83 can be at least 235° C.

System 100 comprises reactors configured for a two stage, counter-current flow decomposition reactor to convert $MgCl_2$ to $Mg(OH)_2$. Within the first stage, reactor 40 is configured for the following reaction to occur:

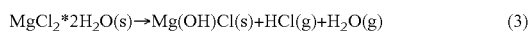

$$MgCl_2 \cdot 2H_2O(s) \rightarrow Mg(OH)Cl(s) + HCl(g) + H_2O(g) \quad (3)$$

Within the second stage, reactor 45 is configured for the following reaction to occur:

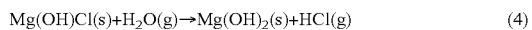

$$Mg(OH)Cl(s) + H_2O(g) \rightarrow Mg(OH)_2(s) + HCl(g) \quad (4)$$

In second reactor 45, steam can be counter-currently contacted with MgOHCl solids fed from first reactor 40. In some embodiments, steam can be generated by a boiler 90 that is heated by gas stream 2. Also, steam recycled from the exhaust of reactors 40 and 45 can be mixed with the steam from boiler 90 to feed reactor 45. Recycled steam may be heated by a heater 65 to obtain the desired final steam temperature to feed reactor 45. Steam is introduced into reactor 45 at a temperature that is substantially the same as the operation temperature of reactor 45 as described below. For example, steam can be introduced into reactor 45 at a temperature between 385° C. and 395° C., such as about 390° C.

The $Mg(OH)_2$ solids exiting reactor 45 are in equilibrium with the vapor leaving reactor 45. In some embodiments, the exiting vapor leaving reactor 45 will comprise at least 0.8 mole of HCl for every mole of $Mg(OH)_2$ produced. For example, the exiting vapor leaving reactor 45 can comprise 0.85 mole of HCl, 0.9 mole of HCl, 0.95 mole of HCl, 0.98 mole HCl for ever mole of $Mg(OH)_2$ produced. The rate of counter-flow through reactor 45 is sufficient to keep the partial pressure of HCl low enough so that reaction (5) equilibrium is shifted to the right. In some embodiments, the counter flow is 100% superheated steam. In other embodiments, the counter flow comprises superheated steam and an inert carrier gas. In some embodiment, the partial pressure of HCl can be maintained at a sufficiently low amount by operating the decomposition reaction 45 under vacuum conditions.

In reactor 40, the vapor mixture of superheated steam and HCl leaving reactor 45 is counter-currently contacted with the magnesium chloride material fed from dryer or evaporator 30 comprising $MgCl_2 \cdot 2H_2O$ solids. In some embodiments, only a portion of the steam exiting reactor 45 is fed to reactor 40. For example, a majority of the vapor exiting reactor 45 can bypass reactor 40 so that additional heat can be recovered in the HCl condenser 76. In some embodiments, the Mg(OH)Cl solids exiting reactor 40 are in equilibrium with the vapor leaving reactor 40. In some embodiments, the exiting vapor leaving reactor 40 will comprise at least an additional 0.8 mole of HCl for every mole of MgOHCl produced. For example, the exiting vapor leaving reactor 40 can comprise an additional 0.85 mole of HCl, 0.9 mole of HCl, 0.95 mole of HCl, 0.98 mole HCl for ever mole of MgOHCl produced. The rate of counter-flow through reactor 40 is sufficient to keep the partial pressure of HCl low enough to maintain a shift of reaction (4) to the right.

The operation temperature for reactor 45 can be between 380° C. and 500° C., such as about 390, 400, 410, 420, 430, 440, 450, 460, 470, or 490° C. In some embodiments, the operation temperature for reactor 45 is between about 385° C. and 395° C., such as about 390° C. The operation temperature for reactor 40 can be between 250° C. and 400° C., such as 260, 270, 280, 290, 300, 310, 320, 330, 340, 350, 360, 370, 380, or 390° C. In some embodiments, the operation temperature of reactor 40 is between about 275° C. and 285° C., such as about 280° C. By way of example, the steam requirements for the two-stage counter-current configuration can be approximately 8.6 lb/hr of steam per lb/hr HCl at 390° C. for second reactor 45 and 280° C. for first reactor 40.

An output of reactor 40 comprises solid MgOHCl. In some embodiments, the solid phase output of reactor 40 is at least 55%, 60%, 65% 70%, 75% 80%, 85% 90%, 95%, 98%, or 99% of MgOHCl. An output of reactor 45 comprises solid $Mg(OH)_2$. In some embodiments, the solid phase output of reactor 45 is at least 55%, 60%, 65% 70%, 75% 80%, 85% 90%, 95%, 98%, or 99% of $Mg(OH)_2$.

In some embodiments, to maintain operation temperatures of reactors 40 and 45, heat can be supplied to the decomposition reactors 40, 45 indirectly through a circulating heating fluid loop to keep the decomposition reactor at the desired temperature. For example, heating fluid jackets about each reactor 40 and 45 can facilitate maintenance of the operation temperature. In the embodiment shown, circulating heating fluid loop 84 is configured to transfer heat from gas stream 2 to reactor 40 and circulating heating fluid loop 85 is configured to transfer heat from gas stream 2 to reactor 45.

In some embodiments, the $MgCl_2$ containing material exiting dryer 30 can be conveyed through a heater 64 before entering reactor 40 to raise the temperature of the solution to substantially equal to the operation temperatures of reactor 40. In some embodiments, while not shown in the one illustrated, a portion of the heating fluid in circulating loop 84 may be directed to heater 64 to heat the $MgCl_2$ containing material fed to reactor 40.

In some embodiments, for circulating heating fluid loop 85, the fluid return temperature (e.g., for the heating fluid leaving reactor 45 and heater 65) can be about 5 to 15° C. above the operation temperature of reactor 40; e.g., the fluid return temperature can be about 400° C. In addition, the fluid supply temperature (e.g., the temperature of the fluid approaching reactor 45 and heater 65) can be about 10 to 45° C. above the operation temperature or 5 to 25° C. above the return temperature; e.g., the fluid supply temperature can be about 415° C. At the intercept of loop 85 with gas stream 2, the temperature of gas stream 2 can be greater than 500° C. or greater than 600° C., e.g., the temperature of a flue gas exhaust stream. In some embodiments, the temperature of gas stream 2 after transferring heat to loop 85 can be at least 10° C. higher than the temperature of the heating fluid approaching reactor 45.

In some embodiments, for circulating heating fluid loop 84, the fluid return temperature (e.g., the temperature of the heating fluid leaving reactor 40 or heater 64) can be about 5 to 15° C. above the operation temperature of reactor 45; e.g., the fluid return temperature can be about 290° C. In addition, the fluid supply temperature (e.g., the temperature of the fluid approaching reactor 40 or heater 64) can be about 5 to 20° C. above the operation temperature or 60 to 100° C. above the return temperature; e.g., the fluid supply temperature can be about 355° C. At the intercept of loop 84 with gas stream 2, the temperature of gas stream 2 can be greater than 500° C. or greater than 600° C., e.g., the temperature of a flue gas exhaust stream. In some embodiments, the temperature of gas stream 2 after transferring heat to loop 85 can be at least 10 degrees higher than the temperature of the heating fluid approaching reactor 40.

The hot $Mg(OH)_2$ solids exiting reactor 45 can be passed through a solids product cooler 74 before entering absorption reactor 10, while the vapor product exiting reactor 40 is combined with the vapor bypass 6 around reactor 40. The combined vapor stream passes through HCl condenser 76 before being pumped to an HCl product tank.

As evident from the operation temperatures of the decomposition reactor, there are significant enthalpy requirements for the decomposition reactor, namely, the reaction enthalpy for the decomposition of $MgCl_2*2H_2O$ to $Mg(OH)_2$ and HCl and the superheated steam requirements for direct steam injection into the decomposition reactor. In some embodiments, system 100 can comprise a gas turbine or be configured to receive gas stream 2 produced from a gas turbine, such as a 60 MW gas turbine 95 in the embodiment shown. In some embodiments, the overall $CO_2$ capture rate can be greater than 70%, 80%, 90%, 95%, or greater than 99%.

In addition to a first gas turbine, system 100 can comprise a furnace (not shown) to burn supplemental natural gas, and use heat recovered from the flue gas at the flame temperature to provide additional heat for steam generation within system 100. In some embodiments, for a two-stage counter-current reactor, the total enthalpy requirement for the process can be about 175 MMBtu/hr. The heat available from 60 MW turbine exhaust gas is about 146 MMBtu/hr, leaving an overall deficiency of about 29 MMBtu/hr that would be required to achieve 100% $CO_2$ capture. Burning 1.4 MMSCFD of supplemental natural gas in a furnace can provide heat recovery from the flue gas of 44.9 MMBtu/hr. In some embodiments, an additional 16-17 MMBtu/hr of enthalpy would be required within system 100 to capture this additional $CO_2$. This results in a net enthalpy surplus that could be used to achieve 100% $CO_2$ capture. If this 1.4 MMSCFD of natural gas were instead fired in a turbine, 5.6 MW of additional electricity could be produced (relative to the 60 MW of electricity produced in the existing turbine).

Figure 2:
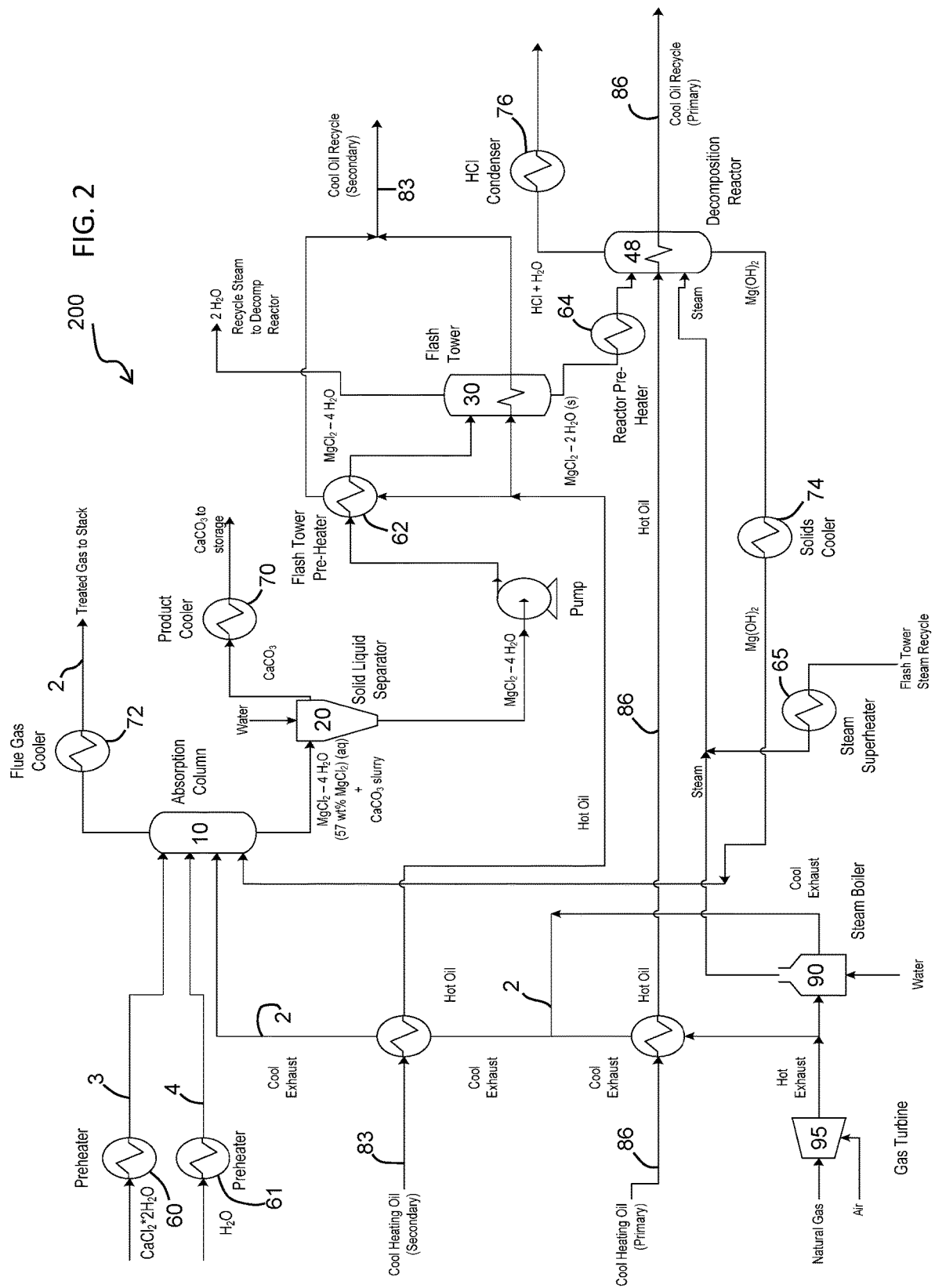
FIG. 2 is a simplified process flow diagram according to some embodiments of the processes provided herein.

Referring now to FIG. 2, shown therein and designated by the reference numeral 200 is a second embodiment of a system configured to remove from a gaseous stream using $Mg(OH)_2$ and regenerate the $Mg(OH)_2$. Embodiment 200 is substantially similar to embodiment 100 described above, except that the decomposition process comprises only a single stage counter flow reactor 48 and circulating heating fluid loop 86 instead of loops 84 and 85. In some embodiments, the operation temperature of reactor 48 can be between 340° C.-360° C., such as 350° C. The superheated steam can be introduced at a temperature substantially the same as the operation temperature.

Figure 3:
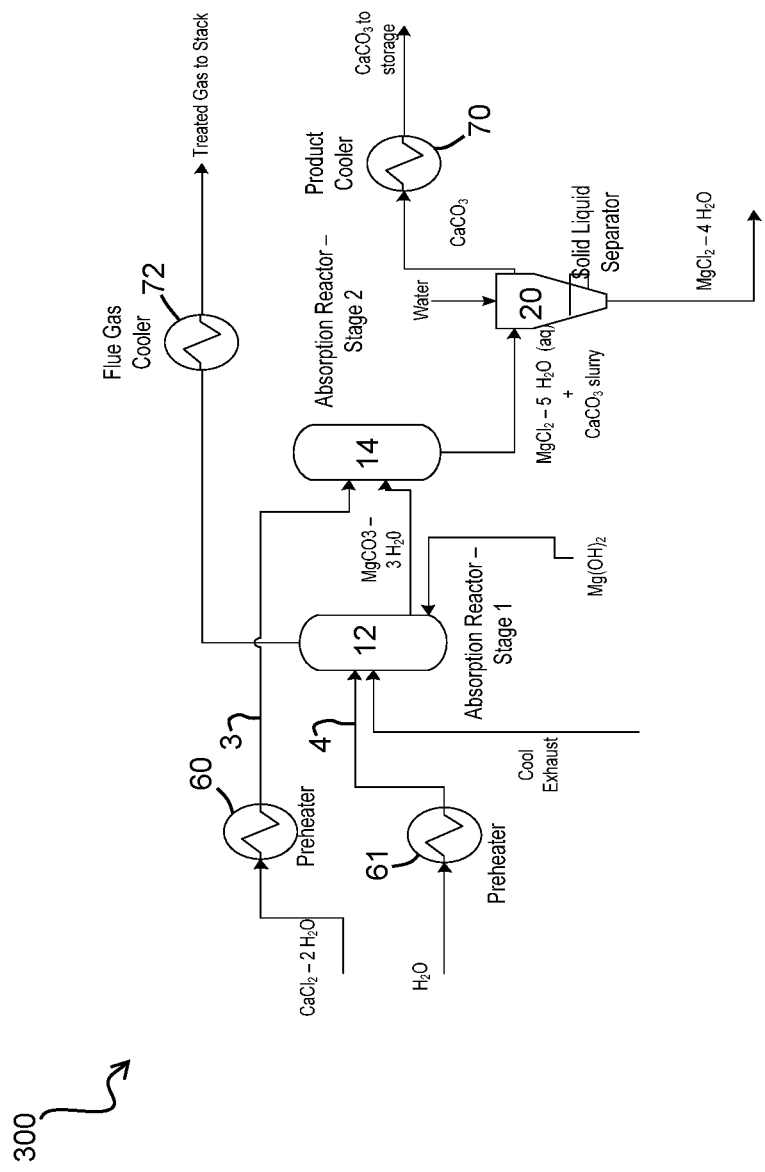
FIG. 3 is a simplified process flow diagram according to some embodiments of the processes provided herein.

Referring now to FIG. 3, shown therein and designated by reference numeral 300 is an embodiment of a two-stage $CO_2$ absorption process that can be substituted for the one stage absorption process described above in connection with reactor 10. The two-stage process is substantially similar to the conditions described for the one-stage process except that two reactors are used instead of one and a slightly higher molar ratio of water to $MgCl_2$ is required. Within the first stage, reactor 12 is configured for the following reaction to occur:

$$Mg(OH)_2(s)+CO_2(g) \rightarrow MgCO_3(aq)+H_2O(l) \qquad (5)$$

Within the second stage, reactor 14 is configured for the following reaction to occur:

$$CaCl_2(aq)+MgCO_3(aq) \rightarrow CaCO_3(s)+MgCl_2(aq) \qquad (6)$$

In some embodiments, in reactor 12, the molar ratio of water to $MgCO_3$ can be about 3.5:1 or about 3:1. In some embodiments, in reactor 14, the molar ratio of water to $MgCl_2$ can be about 5.5:1 or about 5:1.

The above specification and examples provide a complete description of the structure and use of exemplary embodiments. Although certain embodiments have been described above with a certain degree of particularity, or with reference to one or more individual embodiments, those skilled in the art could make numerous alterations to the disclosed embodiments without departing from the scope of this invention. As such, the illustrative embodiments of the present systems and processes for removing carbon dioxide from a gaseous stream and regenerating magnesium hydroxide are not intended to be limiting. Rather, the present devices, systems, and methods include all modifications and alternatives falling within the scope of the claims, and embodiments other than those shown may include some or all of the features of the depicted embodiments. For example, components may be combined as a unitary structure and/or connections may be substituted. Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

The claims are not to be interpreted as including means-plus- or step-plus-function limitations, unless such a limitation is explicitly recited in a given claim using the phrase(s) "means for" or "step for," respectively.

The invention claimed is:

1. A method for sequestering carbon dioxide comprising:
   (a) heating a $MgCl_2$ hydrate-containing material to form step (a) products comprising water, Mg(OH)Cl, and HCl;
   (b) reacting the Mg(OH)Cl with water to form $Mg(OH)_2$ and HCl; and
   (c) reacting the $Mg(OH)_2$ with $CO_2$ and $CaCl_2$ to form $MgCl_2$, $CaCO_3$, and water.

2. The method of claim 1, wherein the magnesium chloride-containing material of step (a) comprises substantially magnesium chloride dihydrate.

3. The method of claim 1, wherein step (a) is performed in a first stage reactor of a two-stage decomposition reactor, and the first stage reactor is heated to a temperature between 250° C. and 400° C.

4. The method of claim 1, wherein step (b) is performed in a second stage reactor of a two-stage decomposition reactor, and the second stage reactor is heated to a temperature between 380° C. and 500° C.

5. The method of claim 1, where the water in the second stage reactor of the two-stage decomposition reactor is provided as steam at a temperature between 350° C. to 450° C.

6. The method of claim 1, wherein the step (c) products are in a liquid phase and a solid phase, the liquid phase comprising an aqueous solution of at least 50% by weight of magnesium chloride.

7. The method of claim 6, wherein a solid phase step (c) product comprises calcium carbonate.

8. The method of claim 1, wherein the step (c) liquid phase comprises a molar ratio of water to magnesium chloride of less than 4.5 to 1.

9. The method of claim 6, further comprising separating at least a portion of the calcium carbonate formed in step (c) from the liquid phase in a solid liquid separator.

10. The method of claim 6, further comprising removing a portion of water from the liquid phase in a dryer to provide a product having a molar ratio of water to magnesium chloride of about 2 to 1.

11. The method of claim 10, wherein the dryer is configured to form magnesium chloride dihydrate.

12. The method of claim 11, further comprising employing the formed magnesium chloride dihydrate as the magnesium chloride-containing material of step (a).

* * * * *